(12) United States Patent
Cao et al.

(10) Patent No.: US 9,893,579 B2
(45) Date of Patent: Feb. 13, 2018

(54) ROTORS AND STATORS FOR DYNAMOELECTRIC MACHINES

(71) Applicant: Emerson Electric Co., St. Louis, MO (US)

(72) Inventors: Pingshan Cao, Suzhou (CN); Xin Li, Suzhou (CN); Xin Li, Suzhou (CN); Zedong Zhang, Suzhou (CN); Vincent Fargo, St. Charles, MO (US)

(73) Assignee: EMERSON ELECTRIC CO., St. Louis, MO (US)

( * ) Notice: Subject to any disclaimer, the term of this patent is extended or adjusted under 35 U.S.C. 154(b) by 239 days.

(21) Appl. No.: 14/775,307

(22) PCT Filed: Mar. 14, 2013

(86) PCT No.: PCT/CN2013/072647
§ 371 (c)(1),
(2) Date: Sep. 11, 2015

(87) PCT Pub. No.: WO2014/139132
PCT Pub. Date: Sep. 18, 2014

(65) Prior Publication Data
US 2016/0036274 A1 Feb. 4, 2016

(51) Int. Cl.
*H02K 21/12* (2006.01)
*H02K 1/27* (2006.01)
(Continued)

(52) U.S. Cl.
CPC .............. *H02K 1/276* (2013.01); *H02K 1/146* (2013.01); *H02K 1/2766* (2013.01); *H02K 21/16* (2013.01); *H02K 29/03* (2013.01); *H02K 2213/03* (2013.01)

(58) Field of Classification Search
CPC ........ H02K 1/276; H02K 29/03; H02K 21/16; H02K 1/146
(Continued)

(56) References Cited

U.S. PATENT DOCUMENTS 5,220,228 A * 6/1993 Sibata .................... H02K 21/16
310/156.46
6,441,524 B2 8/2002 Kaneko et al.
(Continued)

FOREIGN PATENT DOCUMENTS

CN 101247055 8/2008
CN 102577028 7/2012
(Continued)

*Primary Examiner* — Hanh Nguyen
(74) *Attorney, Agent, or Firm* — Harness, Dickey & Pierce, P.L.C.

(57) ABSTRACT

A dynamoelectric machine includes a rotor having a rotor core and permanent magnets, and a stator having teeth. The permanent magnets are arranged in magnet sets. Each magnet set includes one or more of the permanent magnets. The rotor core has a cylindrical periphery and slits. Each of the slits is positioned radially between one of the magnet sets and the cylindrical periphery. Each tooth includes a tooth surface facing the cylindrical periphery. The tooth surface includes an inner portion extending substantially parallel to the cylindrical periphery of the rotor core, and beveled portions positioned on opposing sides of the inner portion of the tooth surface. An air gap between each beveled portion of the tooth surface and the cylindrical periphery of the rotor core is greater than an air gap between the inner portion of the tooth surface and the cylindrical periphery of the rotor core.

18 Claims, 9 Drawing Sheets

(51) Int. Cl.
*H02K 21/16* (2006.01)
*H02K 29/03* (2006.01)
*H02K 1/14* (2006.01)

(58) Field of Classification Search
USPC ........ 310/156.01–156.84, 216.092, 216.093, 310/216.094
See application file for complete search history.

(56) References Cited

U.S. PATENT DOCUMENTS

| | | | |
|---|---|---|---|
| 6,700,270 | B2 | 3/2004 | Yanashima et al. |
| 7,105,971 | B2 | 9/2006 | Asai et al. |
| 7,230,359 | B2 | 6/2007 | Iles-Klumpner |
| 7,282,827 | B2 | 10/2007 | Futami |
| 7,550,891 | B2 * | 6/2009 | Kim .................. H02K 1/08 310/156.53 |
| 2007/0205688 | A1 * | 9/2007 | Murakami ............ H02K 21/16 310/156.28 |
| 2010/0119390 | A1 * | 5/2010 | Baba .................... H02K 1/276 417/423.7 |

FOREIGN PATENT DOCUMENTS

| | | |
|---|---|---|
| CN | 202503416 | 10/2012 |
| JP | 2005-27422 | 1/2005 |
| JP | 2005-245148 | 9/2005 |
| JP | 2013-27240 | 3/2013 |
| JP | 5585691 | 8/2014 |
| KR | 10-1448647 | 10/2014 |

* cited by examiner

ROTORS AND STATORS FOR DYNAMOELECTRIC MACHINES

FIELD

The present disclosure relates to rotors and stators for dynamoelectric machines.

BACKGROUND

This section provides background information related to the present disclosure which is not necessarily prior art.

Typical dynamoelectric machine includes a stator having teeth and a rotor separated from the stator teeth by an air gap. In some instances, a flux density in the air gap may vary. For example, when the machine is operating, the flux density may increase to a peak. This is commonly referred to as a peak flux density.

SUMMARY

This section provides a general summary of the disclosure, and is not a comprehensive disclosure of its full scope or all of its features.

According to one aspect of the present disclosure, a dynamoelectric machine includes a rotor and a stator positioned about the rotor. The rotor includes a rotor core and a plurality of permanent magnets positioned in the rotor core and defining a plurality of rotor poles. The plurality of permanent magnets are arranged in a plurality of magnet sets. Each magnet set includes one or more of the plurality of permanent magnets. The rotor core has a cylindrical periphery, a central axis, and a plurality of slits extending through the rotor core. Each of the plurality of slits is positioned radially between one of the magnet sets and the cylindrical periphery of the rotor core. The stator includes a plurality of teeth. Each tooth includes a tooth surface facing the cylindrical periphery of the rotor core. The tooth surface includes an inner portion extending substantially parallel to the cylindrical periphery of the rotor core, and beveled portions positioned on opposing sides of the inner portion of the tooth surface. An air gap between each beveled portion of the tooth surface and the cylindrical periphery of the rotor core is greater than an air gap between the inner portion of the tooth surface and the cylindrical periphery of the rotor core.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 7A:
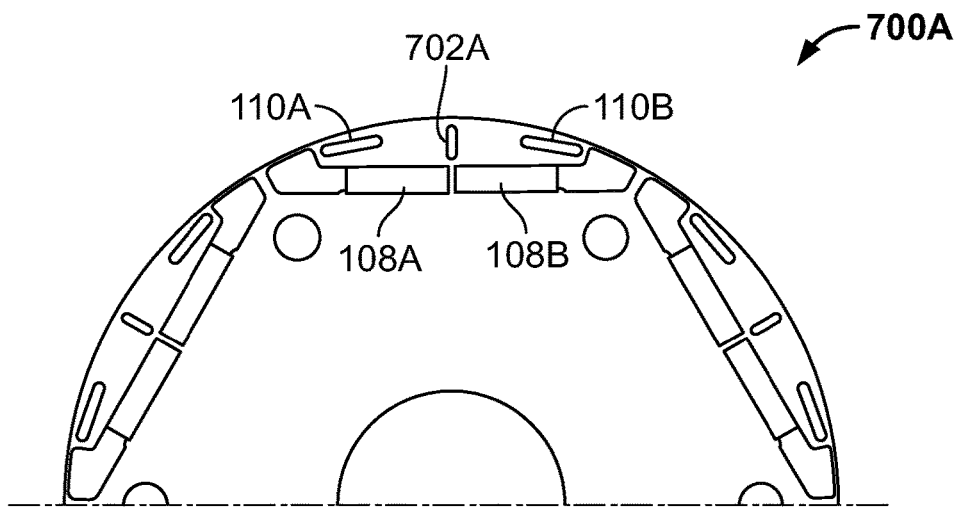
Figure 7B:
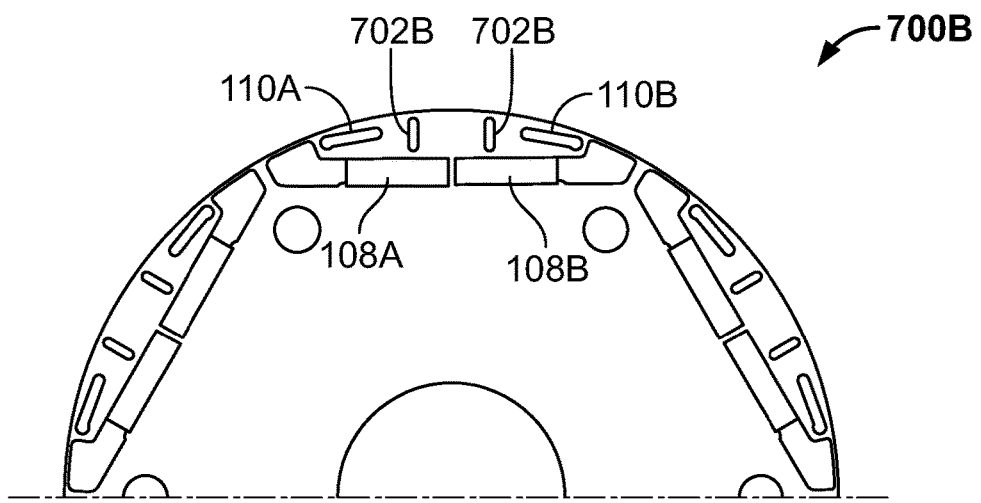
Figure 7C:
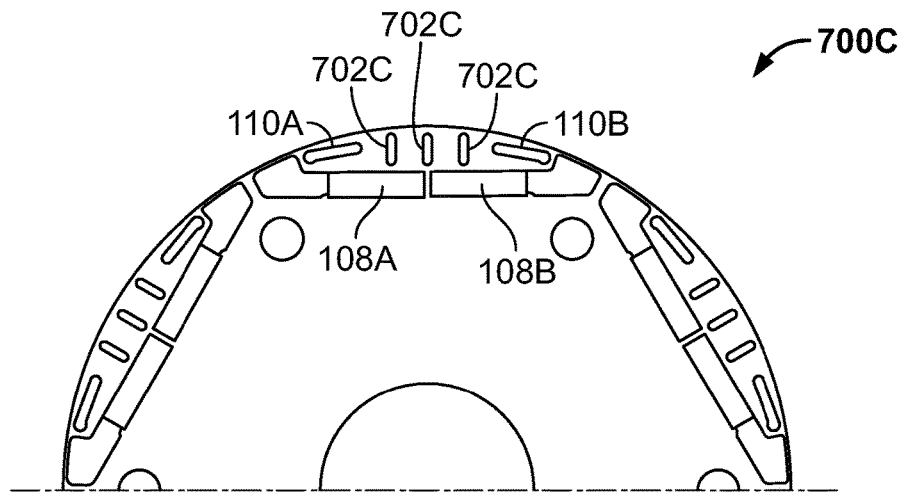

FIGS. 7A-C are cross sectional views of half a rotor including one or more vertical slits according to example embodiments.

Figure 7D:
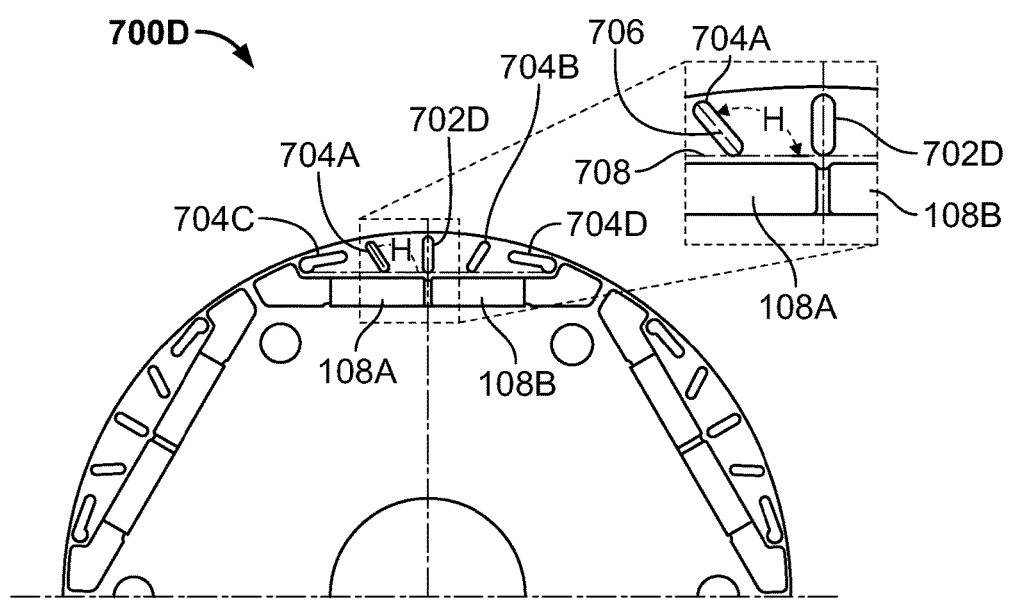

FIG. 7D is a cross sectional view of half a rotor including angled slits according to another example embodiment.

Figure 8:
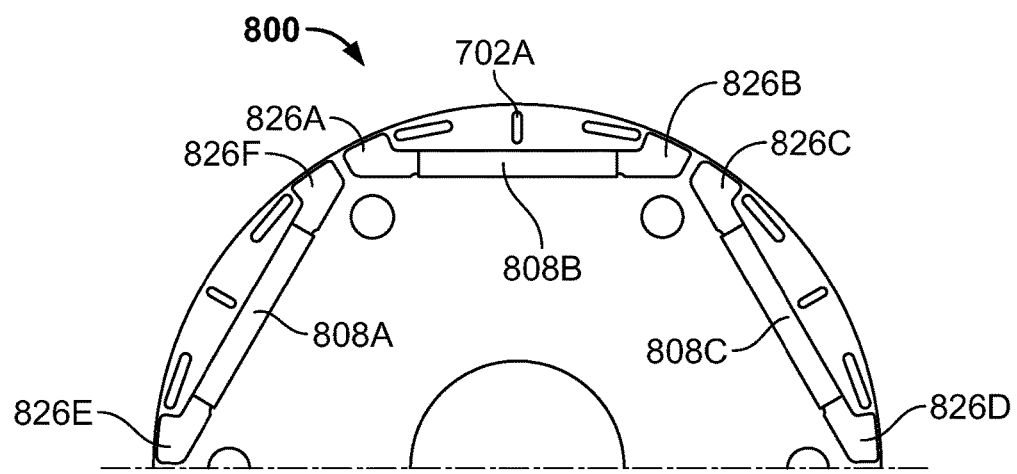

FIG. 8 is a cross sectional view of half of a rotor including one magnet per pole according to another example embodiment.

Figure 9:
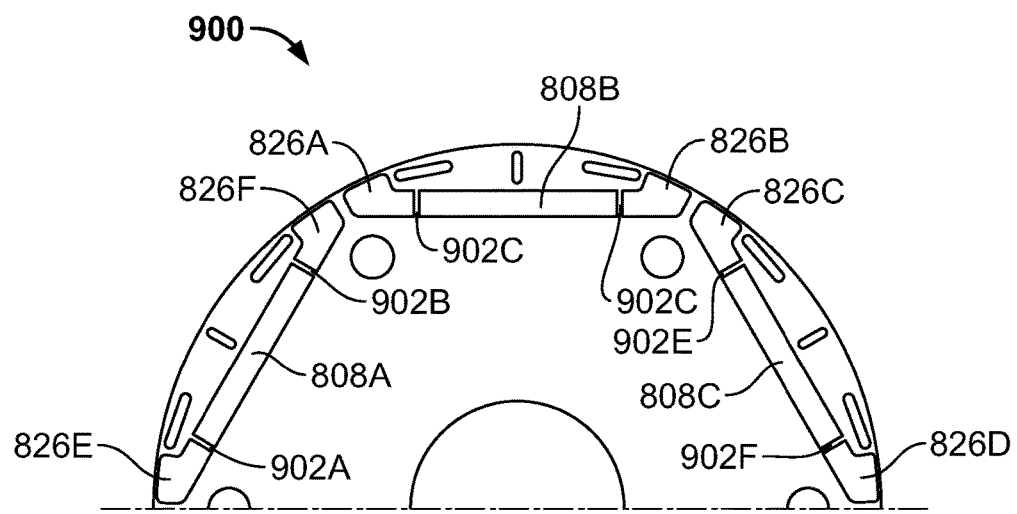

FIG. 9 is a cross sectional view of half of a rotor including a bridge between each end slot and each magnet slot according to still another example embodiment.

Figure 10:
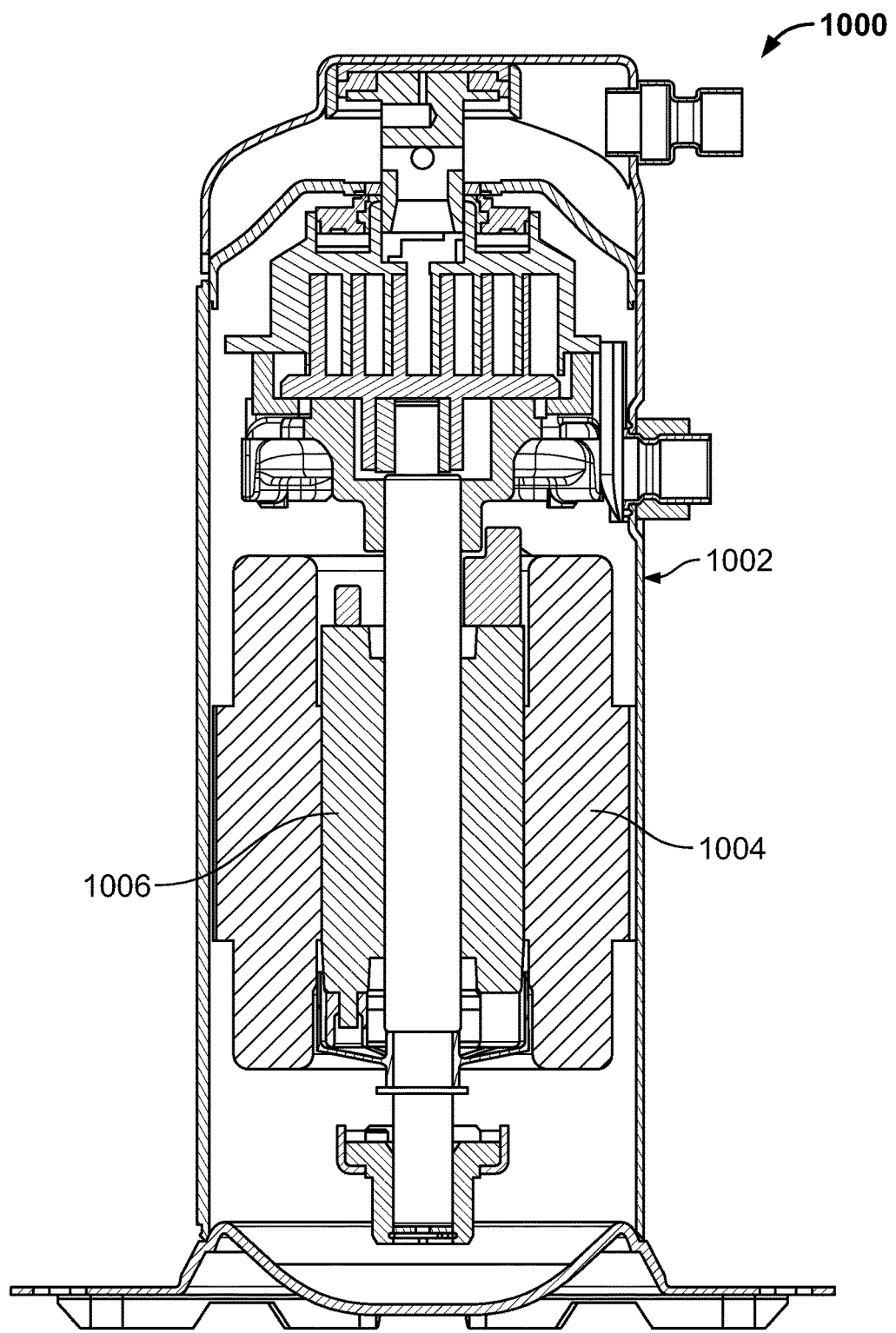

FIG. 10 is a cross sectional view of a compressor including a dynamoelectric machine according to another example embodiment.

Figure 11:
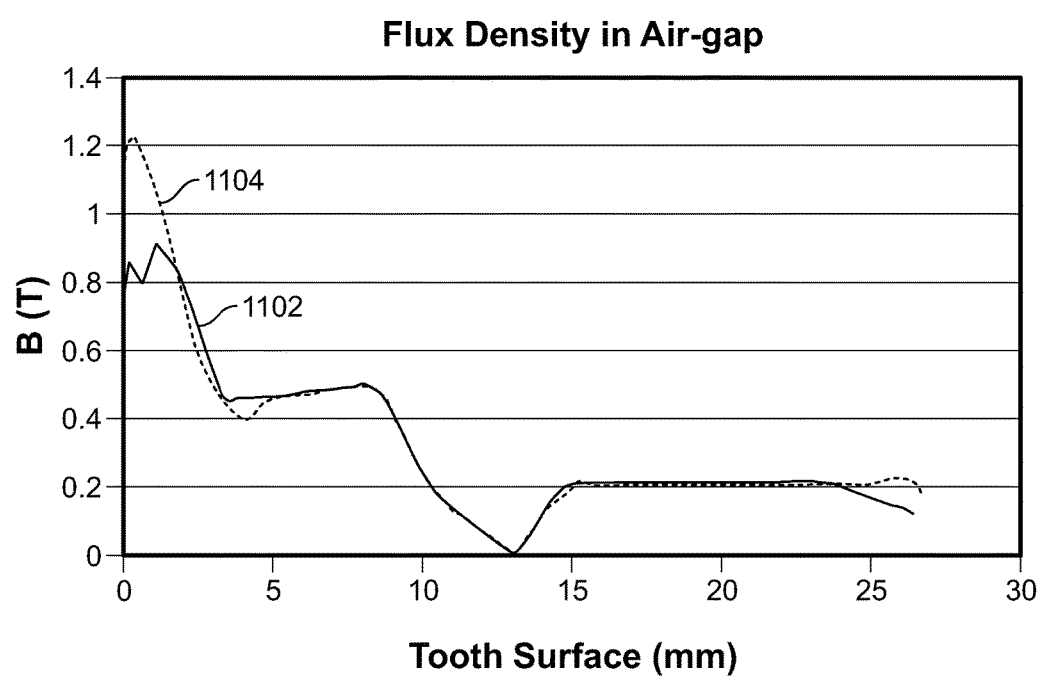

FIG. 11 is a graph comparing flux density of a dynamoelectric machine of the present disclosure and flux density of a known dynamoelectric machine.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
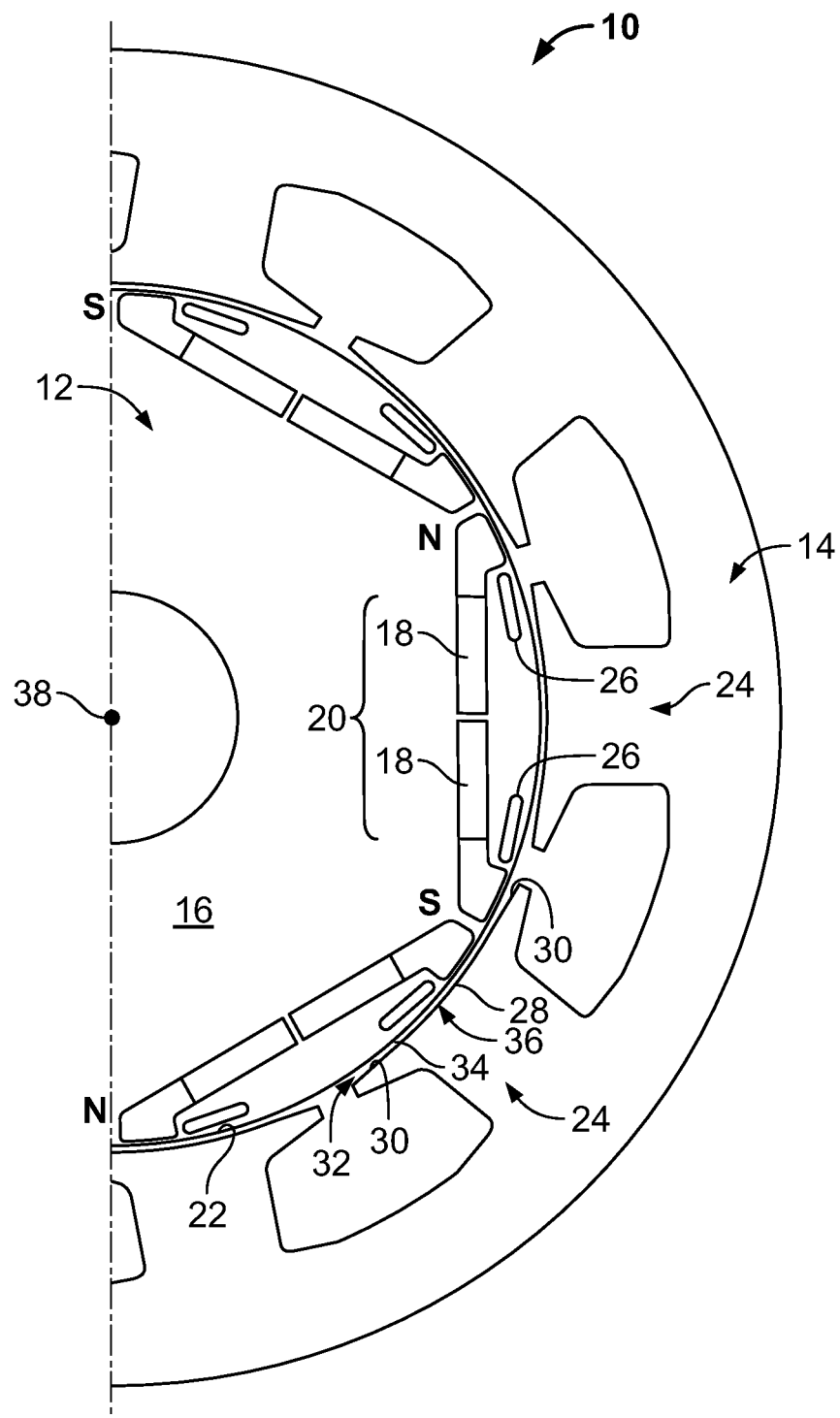
FIG. 1 is a cross sectional view of half of a dynamoelectric machine including a stator and a rotor according to one example embodiment of the present disclosure.

A dynamoelectric machine according to one example embodiment of the present disclosure is illustrated in FIG. 1 and indicated generally by reference number 10. As shown in FIG. 1, the machine 10 includes a rotor 12 and a stator 14 positioned about the rotor 12. The rotor 12 includes a rotor core 16 and permanent magnets 18 positioned in the rotor core 16. The permanent magnets 18 define rotor poles (shown as N and S in FIG. 1). The rotor core 16 has a cylindrical periphery 22, a central axis 38, and slits 26 extending through the rotor core 16.

The stator 14 includes teeth 24. As shown in FIG. 1, each tooth 24 includes a tooth surface 36 facing the cylindrical periphery 22 of the rotor core 16. The tooth surface 36 includes an inner portion 28 extending substantially parallel to the cylindrical periphery 22, and beveled portions 30 positioned on opposing sides of the inner portion 28 of the tooth surface 36.

As shown in FIG. 1, an air gap 32 between the beveled portions 30 and the cylindrical periphery 22 is greater than an air gap 34 between the inner portion 28 and the cylindrical periphery 22. As a result, a peak flux density in the air gaps 32, 34 may be reduced. As further explained below, by reducing the peak flux density, undesirable characteristics of the dynamoelectric machine 100 may be improved.

As shown in FIG. 1, the permanent magnets 18 are arranged in magnet sets 20. In the example of FIG. 1, the dynamoelectric machine 10 includes six magnet sets (of which only three are shown). Each magnet set 20 includes two permanent magnets 18. Alternatively, the dynamoelectric machine 10 may include more or less than six magnet sets and each magnet set may include more or less permanent magnets.

In the example of FIG. 1, the permanent magnets 18 are rectangular in shape. For example, the permanent magnets 18 have a longitudinal dimension which is greater than a transverse dimension.

As shown in the example of FIG. 1, two slits 26 are positioned radially between one of the magnet sets 20 and the cylindrical periphery 22 of the rotor core 16. Although FIG. 1 illustrates the rotor core 16 including two slits 26 positioned radially between the magnet set 20 and the cylindrical periphery 22, the rotor core 16 may include more than two slits positioned radially between one of the magnet sets 20 and the cylindrical periphery 22.

In the example of FIG. 1, the slits 26 are generally elliptically shaped and have a longitudinal dimension which is greater than a transverse dimension. Additionally, an axis of the longitudinal dimension of each slit 26 is not perpendicular to an axis of the longitudinal dimension of an adjacent permanent magnet 18. For example, the axis of the longitudinal dimension of each slit 26 may be substantially parallel to a tangent of the cylindrical periphery 22 of the rotor core 16.

Figure 2A:
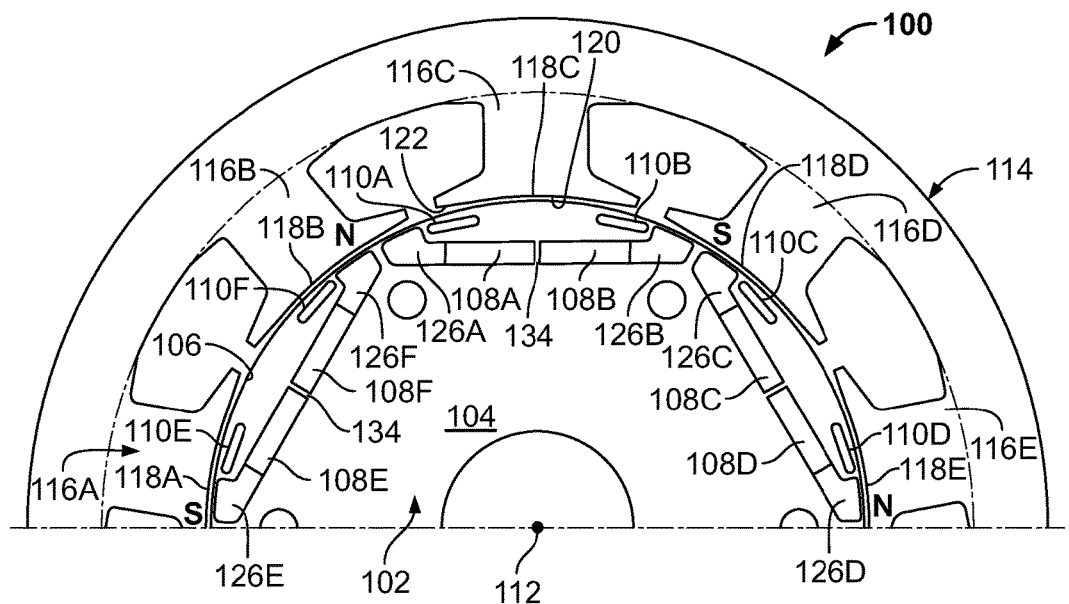
FIG. 2A is a cross sectional view of half of a dynamoelectric machine including a stator and a rotor according to another example embodiment.

FIG. 2A illustrates an example dynamoelectric machine 100 including a rotor 102 and a stator 114 positioned about the rotor 102. As shown in FIG. 2A, the rotor 102 and the stator 114 are positioned concentrically about a central axis 112. The rotor 102 includes a rotor core 104 having a cylindrical periphery 106.

Although not shown completely in FIG. 2A, the rotor 102 includes twelve permanent magnets 108 (of which only six are shown) that define rotor poles. For example, permanent magnets 108A, 108F define a north (N) rotor pole therebetween and permanent magnets 108B, 108O define a south (S) rotor pole therebetween. Thus, the rotor 102 includes six rotor poles. Alternatively, the rotor 102 may include more or less permanent magnets 108. In that event, the rotor 102 will have more or less than six rotor poles. For example, the rotor 102 (and other rotors described herein) may have four rotor poles, twelve rotor poles, or any other desired even number of rotor poles.

As shown in FIG. 2A, the rotor core 104 may include multiple end slots 126 adjacent the permanent magnets 108. In the example of FIG. 2A, the rotor core 104 may include twelve end slots (of which only six end slots 126A-F are shown). In this way, the rotor core 104 includes an end slot for each permanent magnet.

The rotor core 104 may further include a bridge 134 positioned between adjacent permanent magnets 108. For example, as shown in FIG. 2A, the bridge 134 is positioned between the permanent magnets 108A, 108B. Alternatively, the rotor core 104 may not include a bridge between adjacent permanent magnets 108.

In the example of FIG. 2A, the rotor core 104 includes twelve slits 110, of which only six slits 110A-F are shown. The slits 110 have a generally elliptical shape (e.g., similar to slits 26 of FIG. 1).

The slits 110 extend through the rotor core 104 and are positioned radially between one of the permanent magnets 108 and the cylindrical periphery 106 of the rotor core 104. For example, the slit 110A is positioned radially between the permanent magnet 108A and the cylindrical periphery 106. Additionally, the slits 110 may extend substantially perpendicular to a radial axis of the rotor 102 (as shown in FIG. 2A) or alternatively, may extend at any angle suitable angle relative to the radial axis.

As shown in FIG. 2A, the stator 114 includes multiple teeth 116, of which only five teeth 116A-E are shown. Each tooth 116A-E includes a tooth surface 118A-E facing the cylindrical periphery 106 of the rotor core 104. Each tooth surface 118A-E includes an inner portion 120 extending substantially parallel to the cylindrical periphery 106, and beveled portions 122 positioned on opposing sides of the inner portion 120 of the tooth surface. For example, as shown best in FIG. 2B, tooth 116C includes the tooth surface 118C having the inner portion 120 and the beveled portions 122.

Figure 2B:
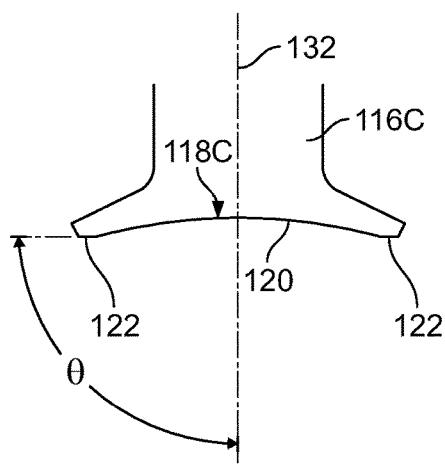
FIG. 2B is a cross sectional view illustrating an enlarged portion of one stator tooth of the stator of FIG. 2A.

Additionally, as shown in FIGS. 2A and 2B, each beveled portion 122 of the tooth surface 118C extends away from the cylindrical periphery 106 of the rotor core 104 in a straight line. For example, each beveled portion 122 may extend away from the cylindrical periphery 106 at an angle θ measured from a centerline 132 of the tooth. In this way, the angle θ is formed between the beveled portion 122 of each tooth surface 118 and the centerline 132 of each tooth 116. The angle θ may be any suitable angle including, for example, about 85 degrees.

Further, as shown in FIGS. 2A and 2B, an air gap 138 between each beveled portion 122 of the tooth surface 118 and the cylindrical periphery 106 is greater than an air gap 136 between the inner portion 120 of the tooth surface 118 and the cylindrical periphery 106. As shown in FIG. 2B, the air gap 138 is defined by the angle θ explained above. Thus, the air gap 138 may be larger or smaller than depending on the angle θ.

Characteristics (e.g., angles, lengths, etc.) of the permanent magnets 108, the slits 110, and the end slots 126 of the rotor 102 and characteristics (e.g., angles, lengths, etc.) of the teeth 116 of the stator 114 may be dependent on each other. Example characteristics of the stator 114 and the rotor 102 are illustrated in FIG. 3 and FIG. 4, respectively.

Figure 3:
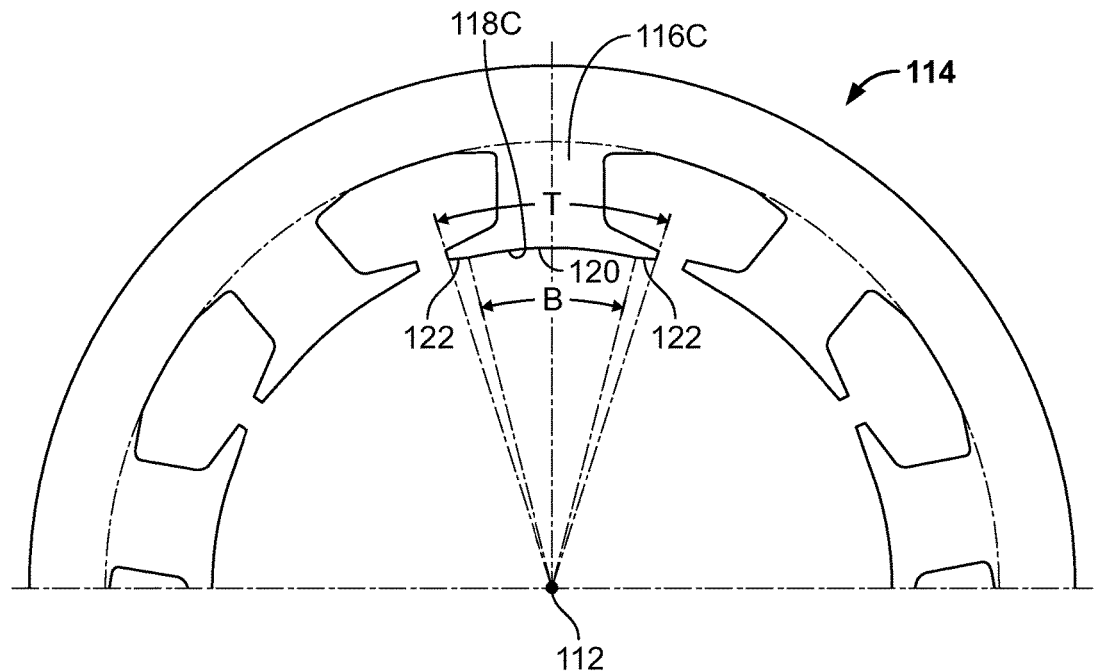
FIG. 3 is a cross sectional view of half of the stator of FIG. 2A illustrating stator teeth characteristics defined by angles relative to a central axis of the stator.
Figure 4:
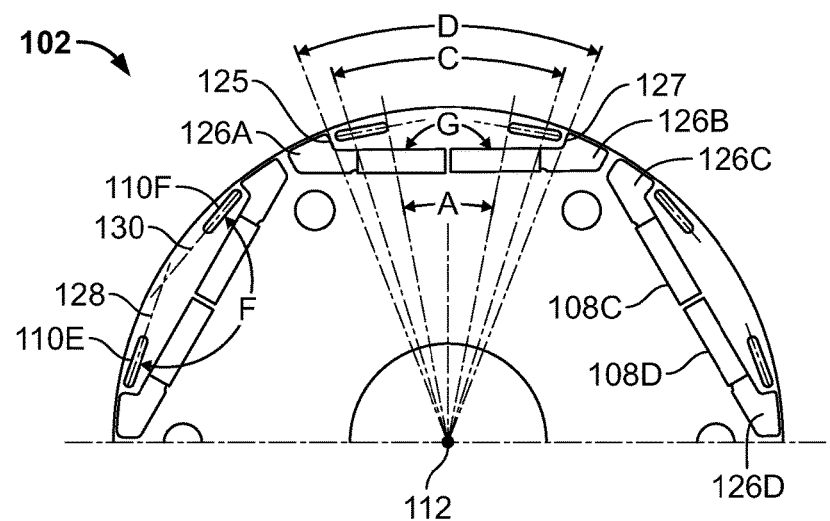
FIG. 4 is a cross sectional view of half of the rotor of FIG. 2A illustrating various rotor characteristics defined by angles relative to a central axis of the rotor.

FIG. 3 illustrates the stator 114 of the machine 100 of FIG. 2A. As shown in FIG. 3, the tooth surface 118C of the tooth 116C may have an angular length defined by an angle T relative to the central axis 112. Thus, in the example of FIG. 3, the angle T is the angle between opposing sides of the tooth surface 118C of the tooth 118C relative to the central axis 112.

Additionally, the inner portion 120 of the tooth surface 118C of the tooth 116C may have an angular length defined by an angle B relative to the central axis 112. In the example of FIG. 3, the angle B is the angle between the beveled portions 122 positioned on the opposing sides of the inner portion 120 of the tooth surface 118C.

Although the angle T and the angle B are shown relative to the tooth 116C, the angles T, B may be the same angles for each tooth (e.g., teeth 116A-F of FIG. 1).

FIG. 4 illustrates the rotor 102 of the machine 100 of FIG. 2A. As shown in FIG. 4, two slits (e.g., slits 110A, 110B of FIG. 2A) may be separated by an angular length defined by an angle A relative to the central axis 112. Thus, the angle A is the angle between two slits relative to the central axis 112.

Additionally, in the example of FIG. 4, two adjacent slits (e.g., slits 110E, 110F) have an angle F therebetween. For example, as shown in FIG. 4, the angle F is the angle defined by an intersection of a line 128 extending along a longitudinal axis of the slit 110E and a line 130 extending along a longitudinal axis of the slit 110F.

As shown in FIG. 4, the permanent magnets 108 (e.g., the permanent magnets 108A, 108B of FIG. 2A) may have an angle G therebetween. For example, the angle G is the angle defined by an intersection of a line extending along a side of the permanent magnet 108A and a line extending along a side of the permanent magnet 108B. For clarity, the permanent magnets 108A, 108B are not labeled in FIG. 4. In the example of FIGS. 2A and 4, the angle G is substantially 180 degrees. Alternatively, the angle G may be an angle more or less than 180 degrees.

In addition, end slots 126 may be separated by an angular length defined by an angle D relative to the central axis 112. The angle D represents a rotor pole angle (e.g., an arc length between end slots of one rotor pole). For example, as shown in FIG. 4, the angle D is the angle between the end slots 126A, 126B relative to the central axis 112. More particularly, the angle D may be measured from an inside portion 125, 127 of each end slot 126A, 126B, respectively.

Further, as shown in FIG. 4, a magnet range for each pole may be defined. The magnet range may be, for example, an angular length between the adjacent magnets defined by an angle C relative to the central axis 112. The angle C represents an effective area of magnet which can produce magnetic flux. In the example of FIG. 4, the angle C is the angle between an outer portion of the permanent magnet 108A and an outer portion of the permanent magnet 108B relative to the central axis 112. For example, the angle C may be measured from a corner of the permanent magnets 108A, 108B.

Although the angles A, C, D, F, G are shown relative to a particular end slot, slit, and/or permanent magnet, the angles A, C, D, F, G may be the same angles for any of the end slots, slits, and/or permanent magnet of the rotor 102.

In preferred embodiments, the characteristics of the stator 114 and the rotor 102 shown in FIG. 3 and FIG. 4 are chosen to satisfy one or more of equations (1)-(4) shown below.

$$B \geq A \geq 90/P \tag{1}$$

$$D \geq C \geq B + G - 180 \tag{2}$$

$$D \geq T + G - 180 \tag{3}$$

$$180 > F \geq 600/P \tag{4}$$

In the example equations, the angles A, B, C, D, F, G, T are in degrees and P is the number of rotor poles of the rotor 102. Alternatively, the example equations may be altered (e.g., altering the numerical constants, etc.) to use other characteristics (e.g., angular lengths, etc.) of the stator 114 and/or the rotor 102.

FIGS. 3 and 4 illustrate the angles A, B, C, D, F, G, T having a particular relationship relative to each other. For example, as shown in FIGS. 3 and 4, in satisfying example equations D≥C≥B+G−180 and D≥T+G−180, the angle C is larger than the angle B and the angle D is larger than the angle T. Alternatively, the angle B may be larger than the angle C (e.g., see FIG. 5) and the angle T may be larger than the angle D (e.g., see FIG. 6) while still satisfying the example equations D≥C≥B+G−180 and D≥T+G−180. Thus, any suitable angles may be employed for the angles A, B, C, D, F, G, T as long as one or more of the example equations are satisfied.

Figure 5:
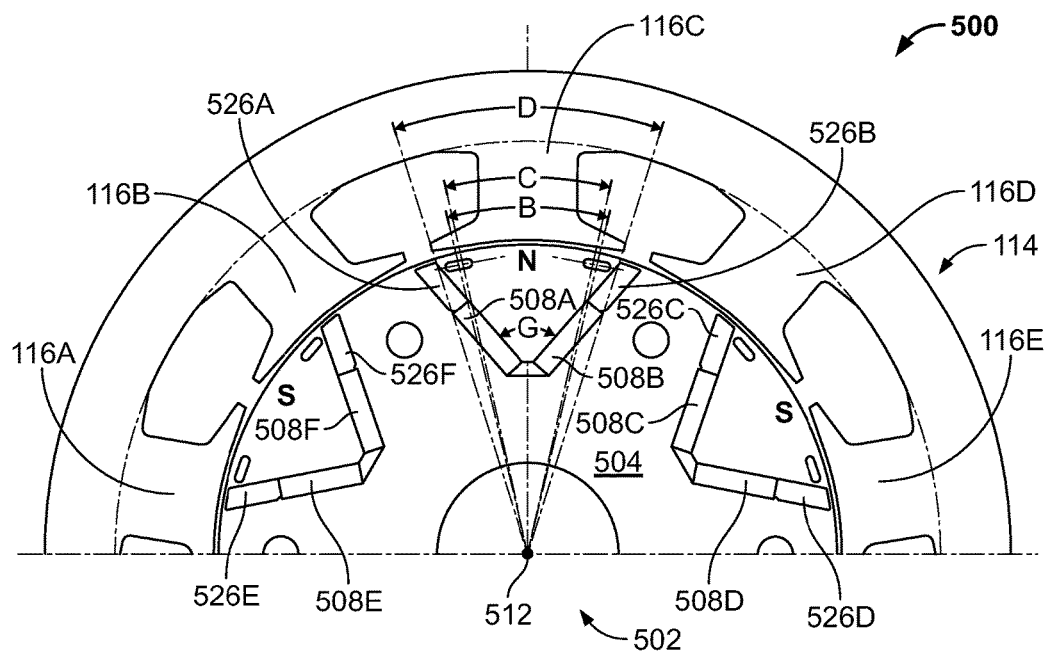
FIG. 5 is a cross sectional view of half of a dynamoelectric machine including the stator of FIG. 2A and a rotor having block magnets according to another example embodiment.

FIG. 5 illustrates an example embodiment of a dynamoelectric machine 500 satisfying at least the example equation D≥C≥B+G−180. The machine 500 includes the stator 114 of FIG. 1 and a rotor 502. The stator 114 includes teeth 116 (of which only teeth 116A-E are shown). The rotor 502 includes a rotor core 504, a central axis 512, and twelve permanent magnets 508 (of which only six magnets 508A-F are shown). The permanent magnets 508 define rotor poles (shown as N and S in FIG. 5). The rotor 502 further includes an end slot 526 adjacent each permanent magnet 508. For example, end slots 526A, 526B are adjacent permanent magnets 508A, 508B, respectively.

As shown in FIG. 5, the angle B of the stator 114 is the same as described above with reference to FIG. 3. Angle G is the angle defined by an intersection of a line extending along a side of the permanent magnet 508A and a line extending along a side of the permanent magnet 508B. In the example of FIG. 5, angle C is the angle between an outer portion of the permanent magnet 508A and an outer portion of the permanent magnet 508B relative to the central axis 512. Additionally, angle D is the angle between end slots 526A, 526B relative to the central axis 512.

In the example of FIG. 5, the angle B is larger than the angle C. This causes a reduction in the angle G (e.g., the angle between the permanent magnets) in order to satisfy the example equation D≥C≥B+G−180. In the example of FIG. 5, the angle G is less than 180 degrees (e.g., substantially 90 degrees, etc.). Alternatively, the angle G may be any suitable angle to satisfy the example equation D≥C≥B+G−180.

As shown in the example of FIG. 5, the permanent magnets 508 are rectangular in shape. For example, the permanent magnets 508 have a longitudinal dimension which is greater than a transverse dimension. Additionally, as shown in FIG. 5, adjacent permanent magnets 508 form a generally V-shaped magnet set. For example, permanent magnets 508A, 508B form one V-shaped magnet set.

Additionally, as shown in the example of FIG. 5, one elliptical shaped slit is positioned radially between each permanent magnet 508 and a cylindrical periphery of the rotor 502. The slits have a longitudinal dimension which is greater than a transverse dimension. Additionally, as shown in FIG. 5, an axis of the longitudinal dimension of each slit is not perpendicular to an axis of the longitudinal dimension of an adjacent permanent magnet 508.

Figure 6:
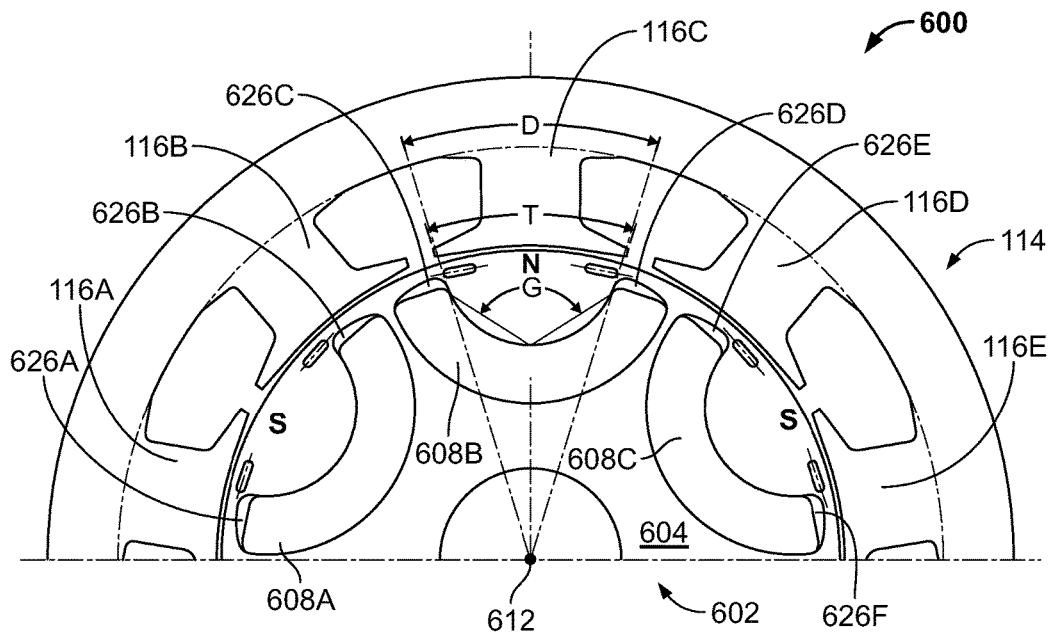
FIG. 6 is a cross sectional view of half of a dynamoelectric machine including the stator of FIG. 2A and a rotor having arc magnets according to still another example embodiment.

FIG. 6 illustrates another example embodiment of a dynamoelectric machine 600 satisfying at least the example equation D≥T+G−180. The machine 600 includes the stator 114 of FIG. 1 having teeth 116 (of which only teeth 116A-E are shown). The machine 600 further includes a rotor 602 having a rotor core 604, a central axis 612, and six permanent arc magnets 608 (of which only three arc magnets 608A-C are shown). The permanent arc magnets 608 define rotor poles (shown as N and S in FIG. 6). The rotor 602 further includes two end slots 626 positioned on each opposing side of each permanent arc magnet 608. For example, end slots 626C, 626D are positioned on opposing sides of the permanent arc magnet 608B.

In the example of FIG. 6, the angle T of the stator 114 is the same as described above with reference to FIG. 3. Angle D is the angle between opposing end slots 626 (e.g., end slots 626C, 626D) relative to the central axis 612. Additionally, as shown in FIG. 6, angle G is an angle defined by an intersection of a line extending from one opposing side of the permanent arc magnet 608B and a line extending from the other opposing side of the permanent arc magnet 608B.

As shown in FIG. 6, the angle T is larger than the angle D. Therefore, in order satisfy the example equation D≥T+G−180, the angle G is reduced. In the example of FIG. 6, the angle G is between 90 degrees and 180 degrees (e.g., substantially 120 degrees, etc.). Alternatively, the angle G may be any suitable angle to satisfy the example equation D≥T+G−180.

FIGS. 7A-C illustrate rotors 700A, 700B, 700C substantially similar to the rotor 100 of FIG. 2A. Each rotor 700A, 700B, 700C may include one or more vertical slits extending substantially parallel to a radial axis of each rotor 700A, 700B, 700C. For example, the rotor 700A of FIG. 7A includes one vertical slit 702A, the rotor 700B of FIG. 7B includes two vertical slits 702B, and the rotor 700C of FIG. 7C includes three vertical slits 702C. Alternatively, any suitable number of vertical slits may be employed.

In the example of FIGS. 7A-C, the vertical slits 702A, 702B, 702C are substantially elliptical. Alternatively, the vertical slits 702A, 702B, 702C may be other suitable shapes without departing from the scope of the present disclosure.

As shown in FIGS. 7A-C, the vertical slits 702A, 702B, 702C are positioned between two slits (e.g., slits 110A, 110B). Further, in the examples of FIGS. 7A-C, the vertical slits 702A, 702B, 702C are positioned substantially between permanent magnets 108A, 108B and a cylindrical periphery of the rotors 700A, 700B, 700C.

Additionally, the slits 110A, 110B may be generally elliptically shaped (e.g., as shown in FIG. 7A). Alternatively, each slit 110A, 110B may be generally elliptically shaped and include an enlarged end portion along an axis of the longitudinal dimension of each slit 110A, 110B (e.g., as shown in FIGS. 7B, 7C).

FIG. 7D illustrates a rotor 700D substantially similar to the rotor 100 of FIG. 2A. The rotor 700D includes one vertical slit 702D and angled slits 704A, 704B, 704C, 704D. The vertical slit 702D extends substantially parallel to a radial axis of the rotor 700D and angled silts 704A, 704B, 704C, 704D are positioned radially between the permanent magnets 108A, 108B and an cylindrical periphery of the rotor 700D. Alternatively, more or less angled slits 704 and/or more vertical slits 702 may be employed.

As shown in FIG. 7D, lines 706, 708 form an angle H. Line 706 bisects the angled slit 704A while line 708 extends from a bottom portion of the angled slit 704A and is parallel to the magnets 108A, 108B. The angle H may be any suitable angle, including for example between 90 and 130 degrees.

In the example of FIG. 7D, the slits 702D, 704A, 704B are generally elliptically shaped as explained above. Additionally, as shown in FIG. 7D, each slit 704C, 704D are generally elliptically shaped and include an enlarged end portion along an axis of the longitudinal dimension of each slit 704C, 704D.

FIG. 8 illustrates a rotor 800 including six permanent magnets 808 (of which only three magnets 808A-C are shown). The rotor 800 also includes an end slot 826 positioned on each opposing end of the magnets 808. For example, as shown in FIG. 8, the end slot 826A is positioned on one end the permanent magnet 808 while the end slot 826B is positioned on an opposing end of the permanent magnet 808.

Additionally, as shown in FIG. 8, the rotor 800 may include the vertical slit 702A of FIG. 7A positioned between each magnet 808 and a cylindrical periphery of the rotor 800. Alternatively, more or less vertical slits may be employed without departing from the disclosure.

FIG. 9 illustrates a rotor 900 substantially similar to the rotor 800 of FIG. 8. However, the rotor 900 includes a bridge 902 positioned between each end slot 826 and each permanent magnet 808. For example, the bridge 902C is positioned between the end slot 826A and the permanent magnet 808B while the bridge 902D is positioned between the end slot 826B and the permanent magnet 808B.

FIG. 10 illustrates a compressor 1000 including a dynamoelectric machine 1002. The dynamoelectric machine 1002 includes a stator 1004 and a rotor 1006 positioned within the stator 1004. The machine 1002, the stator 1004 and/or the rotor 1006 may be any one of the machines, stators, and/or rotors described herein. Further, while the compressor 1000 is a scroll compressor, other types of compressors (including, e.g., piston compressors, screw compressors, etc.) may be employed.

The inventors of the present disclosure have determined that dynamoelectric machines including a stator and/or a rotor described herein satisfying one or more of the example equations (described above) have a reduced peak flux density in an air gap between the stator and the rotor. By reducing the peak flux density, undesirable characteristics of dynamoelectric machines may be improved. For example, magnetic saturation may be avoided, vibration and noise may be reduced, etc. Further, the inventors have found that in cases where one or more of the above example equations are not satisfied, magnetic flux may be reduced (e.g., due to magnet size), the peak flux density may not be reduced, magnet slots may be too small for desired sized magnets, etc.

FIG. 11 is a graph illustrating flux density in an air gap over a tooth surface of a stator tooth. The graph compares flux density of a dynamoelectric machine described herein (represented by line 1102) and flux density of a known dynamoelectric machine (represented by line 1104). As shown in FIG. 11, peak flux density of the dynamoelectric machine described herein is lower than the peak flux density of the known dynamoelectric machine. For example, the peak flux density of the dynamoelectric machine described herein is about 0.9 B(T) while the peak flux density of the known dynamoelectric machine is over 1.2 B(T).

The dynamoelectric machines disclosed herein may be, for example, electric motors and/or generators. For example, a dynamoelectric machine may include a brushless permanent magnet (BPM) motor, a line start permanent magnet motor (LSPM), a permanent magnet (PM) generator, or any other suitable machine employing magnets. Additionally, it should also be understood that the teachings of this disclosure is applicable to any suitable single and/or polyphase machine.

Further, the dynamoelectric machines may include a motor shaft extending through the rotors and windings positioned about the stator teeth. For clarity, the rotor shaft and/or the stator windings are not shown in FIGS. 1-9.

The permanent magnets disclosed herein may be any suitable magnet including, for example, arc magnets, bar magnets, etc. Additionally, the magnets are positioned in a rotor core (e.g., in magnetic slots of the rotor core) and may extend a full length of a rotor (i.e., the entire stack height of the rotor). Alternatively, the magnets may not extend the full length of a rotor. Further, although the figures illustrate embedded magnets, other suitable magnets may be employed including, for example, surface mount magnets.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A dynamoelectric machine comprising:
a rotor including a rotor core and a plurality of permanent magnets positioned in the rotor core and defining a plurality of rotor poles, the plurality of permanent magnets arranged in a plurality of magnet sets, each magnet set including one or more of the plurality of permanent magnets, the rotor core having a cylindrical periphery, a central axis, and a plurality of slits extending through the rotor core, each of the plurality of slits positioned radially between one of the magnet sets and the cylindrical periphery of the rotor core; and
a stator positioned about the rotor and including a plurality of teeth, each tooth including a tooth surface facing the cylindrical periphery of the rotor core, the tooth surface of each said tooth including an inner portion extending substantially parallel to the cylindrical periphery of the rotor core, and beveled portions positioned on opposing sides of the inner portion of the tooth surface,
wherein at least one of the plurality of permanent magnets and at least one tooth of the plurality of teeth are configured to satisfy C≤T, wherein C is an angle between outer portions of the at least one permanent magnet relative to the central axis, wherein T is an angle between opposing sides of the tooth surface of a tooth relative to the central axis, and wherein an air gap between each beveled portion of the tooth surface and the cylindrical periphery of the rotor core is greater than an air gap between the inner portion of the tooth surface and the cylindrical periphery of the rotor core.

2. The dynamoelectric machine of claim 1 wherein the plurality of slits includes at least two slits positioned radially between one of the magnet sets and the cylindrical periphery of the rotor core, wherein the at least two slits and the at least one tooth of the plurality of teeth are configured to satisfy B≥A≥90/P, wherein A is an angle between the at least two slits relative to the central axis of the rotor core, wherein B is an angle between the beveled portions positioned on the opposing sides of the inner portion of the tooth surface, and wherein P is a number of rotor poles of the rotor.

3. The dynamoelectric machine of claim 2 wherein each slit of the at least two slits has an longitudinal axis, wherein the at least two slits are configured to satisfy 180>F≥600/P, and wherein F is an angle defined by an intersection of a line extending along the longitudinal axis of one slit and a line extending along the longitudinal axis of another slit.

4. The dynamoelectric machine of claim 1 wherein the at least one of the plurality of permanent magnets includes two permanent magnets, wherein the rotor core includes two end slots, wherein one end slot of the two end slots is adjacent one permanent magnet of the two permanent magnets, wherein another end slot of the two end slots is adjacent another permanent magnet of the two permanent magnets, wherein the two permanent magnets, the two end slots, and the at least one tooth of the plurality of teeth are configured to satisfy D≥T+G−180, wherein D is an angle between the two end slots relative to the central axis, and wherein G is an angle defined by an intersection of a line extending along a side of one permanent magnet and a line extending along a side of said another permanent magnet.

5. The dynamoelectric machine of claim 4 wherein the two permanent magnets, the two end slots, and the at least one tooth of the plurality of teeth are configured to satisfy D≥C≥B+G−180, and wherein C is the angle between outer portions of the two permanent magnets relative to the central axis.

6. The dynamoelectric machine of claim 4 wherein the rotor core includes a bridge positioned between the two permanent magnets.

7. The dynamoelectric machine of claim 4 wherein the rotor core includes a bridge positioned between each end slot and each permanent magnet.

8. The dynamoelectric machine of claim 1 wherein each magnet set includes a permanent magnet having opposing sides, wherein the rotor core includes end slots adjacent the opposing sides of the permanent magnet, wherein the permanent magnet, the end slots, and the at least one tooth of the plurality of teeth are configured to satisfy D≥T+G−180, wherein D is an angle between the two end slots relative to the central axis, and wherein G is an angle defined by an intersection of a line extending from one opposing side of the permanent magnet and a line extending from another opposing side of the permanent magnet.

9. The dynamoelectric machine of claim 1 wherein the plurality of slits include one or more slits extending parallel to a radial axis of the rotor.

10. The dynamoelectric machine of claim 1 wherein the plurality of slits include one or more angled slits positioned radially between one of the magnet sets and the cylindrical periphery of the rotor core.

11. A compressor comprising the dynamoelectric machine of claim 1.

12. A dynamoelectric machine comprising:
a rotor including a rotor core and a plurality of permanent magnets positioned in the rotor core and defining a plurality of rotor poles, the plurality of permanent magnets arranged in a plurality of magnet sets, each magnet set including one or more of the plurality of permanent magnets, the rotor core having a cylindrical periphery, a central axis, and a plurality of slits extending through the rotor core and including an longitudinal axis, each of the plurality of slits positioned radially between one of the magnet sets and the cylindrical periphery of the rotor core; and
a stator positioned about the rotor and including a plurality of teeth, each tooth including a tooth surface facing the cylindrical periphery of the rotor core, the tooth surface including an inner portion extending substantially parallel to the cylindrical periphery of the rotor core, and beveled portions positioned on opposing sides of the inner portion of the tooth surface,
wherein an air gap between each beveled portion of the tooth surface and the cylindrical periphery of the rotor core is greater than an air gap between the inner portion of the tooth surface and the cylindrical periphery of the rotor core, wherein at least two slits of the plurality of slits are configured to satisfy 180>F≥600/P, and wherein F is an angle defined by an intersection of a line extending along the longitudinal axis of one slit and a line extending along the longitudinal axis of another slit.

13. The dynamoelectric machine of claim 12 wherein one of the magnet sets includes two permanent magnets, wherein the rotor core includes two end slots, wherein one end slot of the two end slots is adjacent one permanent magnet of the two permanent magnets, wherein another end slot of the two end slots is adjacent another permanent magnet of the two permanent magnets, wherein the two permanent magnets, the two end slots, and the at least one tooth of the plurality of teeth are configured to satisfy D≥T+G−180, wherein D is an angle between the two end slots relative to the central axis, wherein T is an angle between opposing sides of the tooth surface of a tooth relative to the central axis, and wherein G is an angle defined by an intersection of a line extending along a side of one permanent magnet and a line extending along a side of said another permanent magnet.

14. The dynamoelectric machine of claim 13 wherein the one or more permanent magnets, the two end slots, and the at least one tooth of the plurality of teeth are configured to satisfy D≥C≥B+G−180, and wherein C is an angle between outer portions of the two permanent magnets relative to the central axis.

15. The dynamoelectric machine of claim 12 wherein the at least two slits and the at least one tooth of the plurality of teeth are configured to satisfy B≥A≥90/P, wherein A is an angle between the at least two slits relative to the central axis of the rotor core, wherein B is an angle between the beveled portions positioned on the opposing sides of the inner portion of the tooth surface, and wherein P is a number of rotor poles of the rotor.

16. A dynamoelectric machine comprising:
a rotor including a rotor core and a plurality of permanent magnets positioned in the rotor core and defining a plurality of rotor poles, the plurality of permanent magnets arranged in a plurality of magnet sets, each magnet set including at least one permanent magnet of the plurality of permanent magnets, the at least one permanent magnet having opposing sides, the rotor core having a cylindrical periphery, a central axis, a plurality of slits extending through the rotor core, and two end slots adjacent the opposing sides of the permanent magnet, each of the plurality of slits positioned radially between one of the magnet sets and the cylindrical periphery of the rotor core; and
a stator positioned about the rotor and including a plurality of teeth, each tooth including a tooth surface facing the cylindrical periphery of the rotor core, the tooth surface including an inner portion extending substantially parallel to the cylindrical periphery of the rotor core, and beveled portions positioned on opposing sides of the inner portion of the tooth surface,
wherein an air gap between each beveled portion of the tooth surface and the cylindrical periphery of the rotor core is greater than an air gap between the inner portion of the tooth surface and the cylindrical periphery of the rotor core, and
wherein the permanent magnet, the end slots, and the at least one tooth of the plurality of teeth are configured to satisfy D≥T+G−180, wherein D is an angle between the two end slots relative to the central axis, wherein T is an angle between opposing sides of the tooth surface of a tooth relative to the central axis, and wherein G is an angle defined by an intersection of a line extending from one opposing side of the permanent magnet and a line extending from another opposing side of the permanent magnet.

17. The dynamoelectric machine of claim 16 wherein the plurality of slits each include an longitudinal axis, wherein at least two slits are configured to satisfy 180>F≥600/P, and wherein F is an angle defined by an intersection of a line extending along the longitudinal axis of one slit and a line extending along the longitudinal axis of another slit.

18. The dynamoelectric machine of claim 17 wherein the plurality of slits includes at least two slits positioned radially between one of the magnet sets and the cylindrical periphery of the rotor core, wherein the at least two slits and the at least one tooth of the plurality of teeth are configured to satisfy B≥A≥90/P, wherein A is an angle between the at least two slits relative to the central axis of the rotor core, wherein B is an angle between the beveled portions positioned on the opposing sides of the inner portion of the tooth surface, and wherein P is a number of rotor poles of the rotor.

* * * * *